Aug. 14, 1962 R. B. CAMPBELL 3,049,011
OPTICAL LIQUID-LEVEL GAGE
Filed Dec. 12, 1960 2 Sheets-Sheet 1
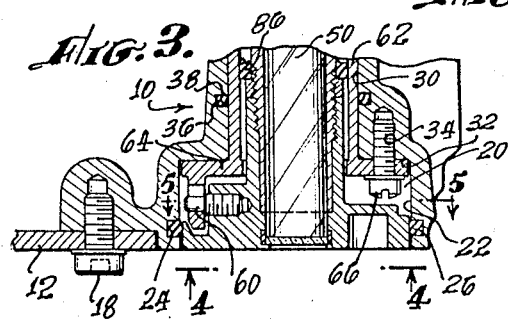
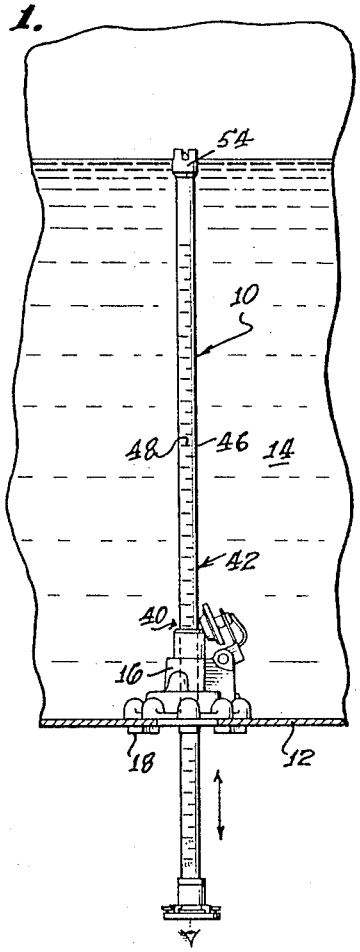
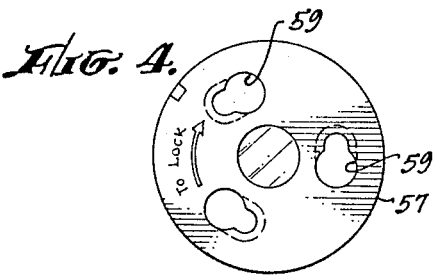
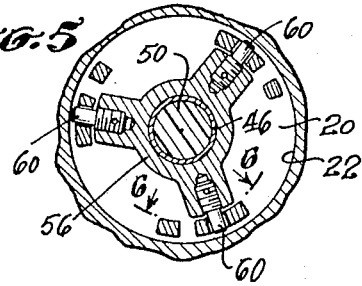
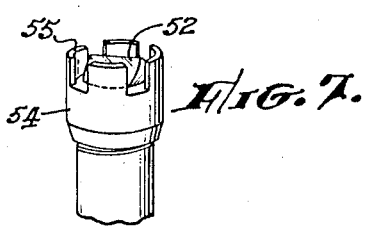
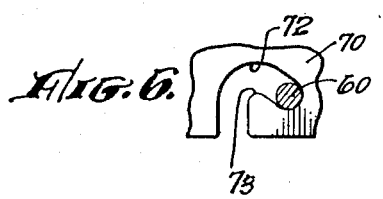
Rodney B. Campbell,
INVENTOR.
BY HIS ATTORNEYS.
Harris, Kiech, Russell & Kern.

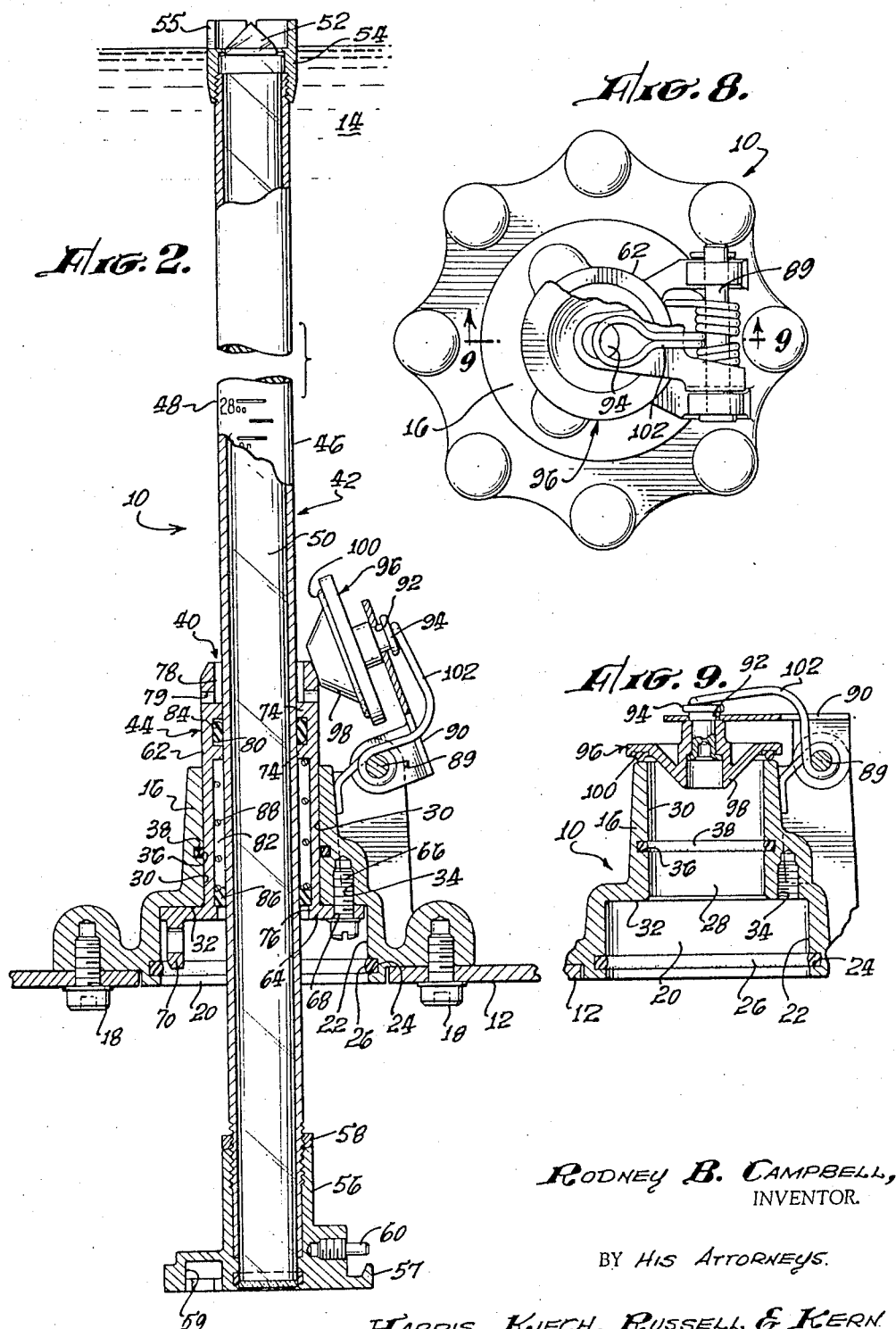

United States Patent Office 3,049,011
Patented Aug. 14, 1962

3,049,011
OPTICAL LIQUID-LEVEL GAGE
Rodney B. Campbell, Glendale, Calif., assignor to Idaho Maryland Mines Corporation, Glendale, Calif., a corporation of Nevada
Filed Dec. 12, 1960, Ser. No. 75,158
5 Claims. (Cl. 73—327)

The present invention relates generally to the measuring instrument art and more particularly to a novel optical liquid-level gage which has utility in measuring the amount of fuel contained in the wing tanks of aircraft and the like.

Briefly stated, one embodiment of the present invention comprises a housing adapted to be fastened to either the upper or lower wall of a vessel containing a body of liquid, said housing containing a passageway with an inner wall extending therethrough. An elongated indicating member is mounted in the passageway for limited movement relative to the housing and contains a rod of clear plastic material which transmits light therethrough and which includes an upper end adapted to extend above the housing in the liquid and a lower end adapted to extend below the housing for viewing by an operator. Sealing means are provided between the indicating member and the inner wall of the passageway to prevent the escape of fluid through the passageway both when the indicating member is in the operative position and in the inoperative position. Means are also provided for removing the indicating member from the housing and reinserting it therein with practically no loss of fluid from the tank.

As is well known to those familiar with the operation of aircraft, it is necessary to periodically check the level of the fuel in the wing tanks of the equipment and this is usually accomplished by means of a dip stick which is manually inserted into openings in the upper wing surfaces. Obviously, this method of checking the fuel level is laborious and time-consuming. On the other hand fuel gages located in the cockpit, which are responsive to floats and other types of sensing equipment contained in the tanks, are not completely reliable because of the malfunctioning of the sensing equipment.

It is an object of the present invention, therefore, to provide a novel optical liquid-level gage for accurately ascertaining the amount of liquid in a container, which can be used quickly and easily by even inexperienced personnel.

Another object is to provide such an optical liquid-level gage which contains relatively few operative parts and which requires a minimum amount of maintenance.

A further object is to provide an optical liquid-level gage which is especially suitable for use with wing tanks of an aircraft. More particularly, it is an object to provide such a gage which can be installed on the under side of the aircraft wings for measuring the amount of fuel contained therein and operated without loss or leakage of fuel from the tanks. Specifically, it is an object to provide such a device which can be used without loss or leakage of fuel, and which can be removed for servicing and reinstalled in the wing with practically no loss of fuel from the tanks.

Further objects and advantages of the present invention will be apparent from the following detailed description, reference being had to the accompanying drawings wherein a preferred embodiment is shown.

In the drawings:

FIG. 1 is a side elevational view of an optical liquid-level gage constructed in accordance with the teachings of the present invention, shown mounted in the lower surface of a wing tank of an aircraft and in the operative position;

FIG. 2 is an enlarged vertical sectional view of the device shown in FIG. 1;

FIG. 3 is an enlarged fragmentary vertical sectional view of the lower portion of the housing showing the device in the locked or inoperative position;

FIG. 4 is a bottom plan view of the device taken on line 4—4 in FIG. 3;

FIG. 5 is a horizontal sectional view taken on the line 5—5 in FIG. 3;

FIG. 6 is an enlarged fragmentary vertical sectional view taken on the line 6—6 in FIG. 5;

FIG. 7 is a fragmentary perspective view of the upper end of the measuring member;

FIG. 8 is an enlarged top plan view of the housing with the measuring tube assembly moved therefrom; and FIG. 9 is a fragmentary vertical sectional view taken on the line 9—9 in FIG. 8.

Referring to the drawings more particularly by reference numerals, 10 indicates a novel optical liquid-level gage embodying the teachings of the present invention, shown installed in the lower wing surface 12 of an aircraft for measuring the level of a body of fuel 14.

The gage includes a housing 16 which is adapted to be fastened to the wing surface 12 on the inside of the tank by means of machine bolts 18. The housing contains a lower cylindrical chamber 20 with an inner wall 22 containing an annular groove 24. A plastic ring-like sealing member 26 is positioned in the annular groove 24 and projects beyond the surface of the wall 22 for a purpose to appear.

A cylindrical passageway 28 with an inner wall 30 extends through the housing in communication with the lower chamber 20, the diameter of said passageway being less than the diameter of the chamber so as to provide a shoulder 32 therebetween. Threaded recesses 34 are contained in the shoulder in spaced-apart relationship. The inner wall 30 contains an annular groove 36 spaced inwardly from the chamber 20 and mounted therein is an O-ring 38, the latter projecting beyond the wall surface for use as a sealing member.

Removably mounted within the chamber 20 and the passageway 28 is a slip rod assembly 40 which includes a rod member 42 slidably mounted in a sleeve 44. The rod member 42 includes a cylindrical tube 46 which contains graduations 48 on the outer surface thereof for indicating the volume of fuel in the tank as will be discussed more fully hereinafter. Mounted within the tube 46 is a rod 50 of clear methacrylate or like material which transmits light therethrough, the upper end of the rod being wedge-shaped as at 52 and the lower end being ground flat. Threaded on the upper end of the tube 46 is a shielding cap 54 (FIG. 7) which has spaced upwardly extending flanges 55 for protecting the wedge-shaped tip 52 from damage. Threaded on the lower end of the tube 46 is a flange member 56 with an outer peripheral surface 57 which is of substantially the same diameter as the sealing member 26. An annular locking member 58 is positioned on the tube 46 above the flange member 56. The lower surface of the flange member is provided with spaced-apart wrench sockets 59 which are undercut for a purpose to appear, and projecting radially from the sides of the flange are three circumferentially spaced bayonet members 60 for use in locking the slip rod assembly 40 in an inoperative position. The sleeve 44 includes a body portion 62 and a lower flange portion 64 and is removably fastened to the housing 16 by machine screws 66 which extend through openings 68 in the flange portion and into the threaded recesses 34 previously described. Depending from the flange portion 64 are three lug members 70 which are spaced-apart the same distance as the bayonet member 60 and which contain hook-shaped slots 72 with intermediate humps 73

(FIG. 6) for receiving said bayonet members in locking relationship. The inner surface of the body portion 62 of the sleeve is provided with two spaced-apart annular ridges 74 adjacent the upper end thereof and a short annular shoulder 76 is provided at the bottom so as to define an upper cavity 78 containing side ports 79, an intermediate cavity 80, and a lower cavity 82 the outer diameter of the upper cavity 78 being sufficient to receive the shielding cap 54. An O-ring 84 is positioned in the intermediate cavity 80 so as to be in sliding sealing engagement with the outer surface of the tube 46. A ring 86 is slidably positioned in the lower cavity immediately above the shoulder 76 and a coiled spring 88 is positioned about the tube 46 between the ring 86 and the lowermost annular ridge 74 so as to urge the ring 86 into engagement with the shoulder 76.

Pivotally mounted on the upper end of the housing 16 on a pin 89 is a bracket 90 which has an opening 92 adjacent the free end thereof, the latter loosely receiving a pin 94 which is fastened to a disc-like closure member 96. As shown in FIGS. 2 and 9, the closure member 96 has a protuberant conical-shaped inner portion 98 and a sealing ring 100 concentric therewith, the diameter of the sealing ring being substantially the same as the diameter of the upper end of the housing 16. A spring 102 is coiled about the pin 89 with one end in engagement with the housing and the other end thereof in engagement with the pin 94 so as to urge the closure member 96 toward the upper end of the housing and a closed position.

In the preferred manner of usage, the slip rod assembly 40 remains mounted in the housing 16 by means of the screws 66 while the aircraft is in flight and also when the device is being used to measure the amount of fuel 14. Stating it differently, the slip rod assembly is only removed from the housing for inspection and maintenance work, as will be discussed more fully hereinafter. Thus, when the device is being used to measure the fuel level, the rod member 42 is in the operative position shown in FIGS. 1 and 2 and is free to move in the vertical direction relative to the sleeve 44 and the housing 16. It will be noted that the O-ring 84 prevents leakage of the fuel from the tank between the rod member 42 and the inner surface of the sleeve member 44. In addition, the sealing member 38 prevents leakage in the sleeve 44 and the housing 16.

Assuming that the rod member 42 is inserted into the wing cavity a sufficient distance so that the wedge-shaped tip 52 thereof is above the upper level of the fuel 14, any incident light which enters the plastic rod 50 at the lower ends thereof passes upwardly therethrough and out the wedge-shaped tip 52. Such light is then reflected from the interior surfaces of the wing tank and re-enters the upper tip of the rod 50 so that when the operator views the interior of the rod 50 from the lower end thereof it will appear to be illuminated. Obviously, if the device is being used at night, a flashlight or the like is used to provide the incident light at the lower end of the rod. The rod member 42 is then slowly lowered relative to the housing 16 and the body of fuel in the tank until the aforementioned illumination begins to disappear and the interior of the rod becomes darkened. This will occur as the tip 52 enters the liquid fuel because in such a position the light transmitted from the tip is absorbed by the liquid and is not reflected to illuminate the interior of the rod. Consequently, when the tip is completely beneath the surface, the rod 50 will appear dark. At this point, the volume of fuel within the tank is read on the graduated scale 48 at the point adjacent the lower surface of the flange portion 64. Although the rod 50 is shown with a linear lower end, it is to be understood that the lower end thereof could be bent at a 90° angle to permit viewing of the interior of the rod from the side of the device.

After the fuel level reading has been taken the rod 42 may be moved to the inoperative or stored position shown in FIG. 3 by moving the flange member 56 upwardly into the chamber 20. Thus, as the annular locking member 58 engages the ring 86, the latter is forced upwardly against the action of the spring 88. As the upward movement continues, the bayonet members 60 are guided into the lower extremities of the hook-shaped slots 72 and the flange member 56 is rotated in the clockwise direction after the humps 73 are cleared so as to cause the bayonet members 60 to become positioned in the ends of the slots 72 as shown in FIG. 6. It will be noted that the action of the spring 88 urging the ring 86 and the flange member 56 in the downward direction maintains the bayonet members 60 in the locked position because of the shape of the slots 72. Referring to FIG. 3, when the device is in the inoperative or locked position, the peripheral surface 57 of the flange member 56 is in sealing engagement with the sealing member 26 and the outer surface of the flange member 56 is substantially flush with the outer surface of the wing. Thus, there are three sealing members between the interior of the tank and the wing surface, viz. the O-ring 84 and the sealing members 38 and 26.

To move the rod member 42 from the inoperative to the operative position shown in FIGS. 1 and 2, the flange member 56 is moved inwardly against the holding action of the spring 88 until the bayonet members 60 clear the humps 73 and the flange member is then rotated in the counterclockwise direction. When the bayonet members 60 are in alignment with the lower extremities of the slots 72, the action of the spring 88 is permitted to move the flange member 56 out of the chamber 20. Thereafter, the flange member can be grasped by the hand and moved to the operative position previously described.

Although the rod member 42 can be locked and unlocked by pressing one's fingers against the lower surface of the flange member 56, it is preferred to use a special wrench which contains prongs for insertion into the sockets 59 which are undercut as previously described so that the wrench can be used for pulling the rod member 42 to the operative position.

When it is desired to remove the entire slip rod assembly 40 for inspection or maintenance, the rod member 42 is first moved to the operative position shown in FIGS. 1 and 2. The screws 66 are then removed and the assembly 40 withdrawn from the housing. As shown in FIGS. 1 and 2, when the sleeve 44 is positioned within the housing 16, the protuberant portion 98 of the closure member 96 bears against the inner end of said sleeve so as not to scratch the graduated surface of the tube 46. However, when the sleeve 44 is withdrawn along the other elements of the slip rod assembly, the closure member 96 is pivoted inwardly under the force of the spring 102 until it contacts the inner end of the housing 16 and the ring 100 is seated on the inner end of the housing in sealing engagement therewith as shown in FIGS. 8 and 9. During the removal of the slip rod assembly 40, the rod member 40 is first moved downwardly relative to the sleeve 44 until the shielding cap 54 is received in the upper cavity 78, the ports 79 permitting the escape of trapped fuel. This positions the tops of the flanges 55 only a short distance above the upper end of the sleeve 44 so that as the entire assembly 40 is withdrawn the closure member 96 moves from the end of the sleeve 44 to the cap 54 without engaging the calibrated surface of the tube 46. Then, as the sleeve 44 is withdrawn from the housing 16, the O-ring 38 remains in sealing engagement with the outer surface of the body portion 62 until after the closure member 96 has seated on the upper end of the housing 16. In like manner, when the rod assembly 40 is reinserted into the housing 16, the body portion 62 of the sleeve 44 engages the O-ring 38 before the closure member 96 is moved from its sealing position. Consequently, only the fuel in the upper end of the shielding cap 54 is lost during the removal of the assembly from the housing and there is no loss whatsoever when the assembly is reinserted into the housing.

It will also be noted that the conical surface of the protuberant portion 98 aids in guiding the closure member 96 to the sealing position, and the loose fit of the pin 94 in the bracket opening 92 compensates for any angular differences between the plane of the sealing member 100 and the upper edge of the housing 16.

Although the device has been shown and described as mounted in the lower surface of the tank because that is where it has greatest utility, it is to be understood that it can also be mounted in the upper surface thereof whereby the upper surface of the fuel is located by moving the rod member 42 downwardly until the interior of the rod 50 becomes darkened. In this type of installation the device actually measures the void above the fuel and therefore the graduations 48 have to be arranged accordingly.

Thus, it will be apparent that there has been provided a novel optical liquid-level gage which fulfills all of the objects and advantages sought therefor. It is relatively simple in operation and can be used even by inexperienced personnel in quickly and easily ascertaining the level of the fuel in wing tanks and the like. It has few movable parts and requires very little maintenance. Numerous sealing members are provided to prevent the loss or leakage of fuel during usage, and the novel construction prevents the rod assembly to be removed from and reinserted in the supporting housing with only the loss of a negligible amount of fuel.

It is to be understood that the foregoing description and the accompanying drawings have been given only by way of illustration and example and that changes and alterations in the present disclosure which will be readily apparent to one skilled in the art are contemplated as within the scope of the present invention.

I claim:

1. An optical liquid-level gage comprising: a housing adapted to be fastened to the lower wall of a vessel containing a body of liquid; a passageway with an inner wall extending through said housing; an elongated indicating member mounted in said passageway for limited axial movement relative to the housing, said indicating member including a rod of clear plastic material which transmits light therethrough and which contains an upper end adapted to extend above the housing in the liquid and a lower end adapted to extend below the housing for viewing by an operator; liquid-level indicating means associated with the rod for measuring the amount of liquid in the vessel; and sealing means between the indicating member and the inner wall of passageway to prevent the escape of fluid through said passageway during the axial movement of the indicating member.

2. An optical liquid-level gage comprising: a housing adapted to be fastened to the lower wall of a vessel containing a body of liquid; a passageway with an inner wall extending through said housing; a rod-like indicating member mounted in said passageway for limited axial movement relative to the housing between an operative position and an inoperative position, said indicating member including a rod of clear plastic material which transmits light therethrough and which contains an upper end adapted to extend above the housing in the liquid and a lower end adapted to extend below the housing for viewing by an operator; liquid-level indicating means associated with the rod for measuring the amount of liquid in the vessel; sealing means between the indicating member and the inner wall of the passageway to prevent the escape of fluid through said passageway; means for releasably locking the indicating member in the inoperative position; and yieldable means urging the indicating member toward the operative position.

3. An optical liquid-level gage comprising: a housing with an inner end adapted to be fastened to the lower wall of a vessel containing a body of liquid; a passageway with an inner wall extending through said housing for communication with the interior of said vessel; an indicating assembly removably mounted in said passageway, said assembly including a sleeve member with an inner end positioned in the passageway and an indicating member containing a rod of clear plastic material which transmits light therethrough mounted in the sleeve member for limited axial movement relative thereto; a closure member pivotally mounted adjacent the inner end of the housing and movable between an open position in which it is in engagement with the indicating assembly and a closed position in which it is seated on the inner end of the housing closing off the passageway when the indicating assembly is removed therefrom, said closure member including a bracket having an opening adjacent one end thereof, and a disc-like sealing member containing a supporting pin loosely received in said opening in supporting relationship therewith whereby said sealing member has limited pivotal movement relative to the bracket; and yieldable means in engagement with said supporting pin urging said disc-like sealing member toward the closed position.

4. An optical liquid-level gage comprising: a housing with an outer face adapted to be fastened to the lower wall of a vessel containing a body of liquid; a passageway through said housing; an indicating assembly mounted in said passageway and including an indicating member axially movable relative to the housing between an operative position and a locked position, said indicating member containing a tubular member with an outer surface marked with graduations and an upper end and a lower end, a flange member with an outer surface mounted on the lower end of the tubular member, and a rod of clear plastic material which transmits light therethrough mounted within the tubular member so as to extend from adjacent the flange member to the upper end of the tubular member, the outer surface of the flange member being coextensive with the outer face of the housing when the indicating member is in the locked position and displaced downwardly therefrom when it is in the operative position; and manually operable means releasably maintaining the indicating member in the locked position.

5. An optical liquid-level gage comprising: a housing with an outer face adapted to be fastened to the lower wall of a vessel containing a body of liquid; a passageway through said housing; an indicating assembly mounted in said passageway and including an indicating member axially movable relative to the housing between an operative position and a locked position, said indicating member containing a tubular member with an outer surface marked with graduations and an upper end and a lower end, a flange member with an outer surface mounted on the lower end of the tubular member, and a rod of clear plastic material which transmits light therethrough mounted within the tubular member so as to extend from adjacent the flange member to the upper end of the tubular member, the outer surface of the flange member being coextensive with the outer face of the housing when the indicating member is in the locked position and displaced downwardly therefrom when it is in the operative position; manually operable means releasably maintaining the indicating member in the locked position; and yieldable means urging the indicating member toward the operative position.

References Cited in the file of this patent

UNITED STATES PATENTS

| | | |
|---|---|---|
| 1,521,668 | Bond | Jan. 6, 1925 |
| 1,883,971 | Kryzanowsky | Oct. 25, 1932 |
| 2,090,514 | Folmsbee | Aug. 17, 1937 |
| 2,127,042 | Morrell | Aug. 16, 1938 |
| 2,614,426 | Darlington | Oct. 21, 1952 |
| 2,949,776 | Field et al. | Aug. 23, 1960 |